United States Patent [19]

Schranz

[11] 4,368,208
[45] Jan. 11, 1983

[54] WATER-SOLUBLE CURCUMIN COMPLEX

[75] Inventor: John L. Schranz, Palos Hills, Ill.

[73] Assignee: McCormick & Company, Inc., Hunt Valley, Md.

[21] Appl. No.: 253,731

[22] Filed: Apr. 13, 1981

[51] Int. Cl.³ .................. A23L 1/272; A23L 1/275; A23L 1/04
[52] U.S. Cl. .................. 426/250; 426/540; 426/576; 426/262; 260/236.5
[58] Field of Search .............. 426/250, 540, 576, 262; 260/236.5; 8/80

[56] References Cited

U.S. PATENT DOCUMENTS

| | | | |
|---|---|---|---|
| T887,006 | 6/1971 | Burness et al. | 426/576 |
| 2,861,891 | 11/1958 | Bauernfeind et al. | 426/576 |
| 2,982,656 | 5/1961 | Langenan | 426/250 |
| 3,316,101 | 4/1967 | Borenstein et al. | 426/576 |
| 3,483,002 | 12/1969 | Stein | 426/576 |
| 3,904,771 | 9/1975 | Donnelly | 426/576 |
| 3,943,262 | 3/1976 | Winkler | 426/540 |
| 4,061,786 | 12/1977 | Winkler | 426/250 |
| 4,138,212 | 2/1979 | Stransky | 426/540 |
| 4,139,645 | 2/1979 | Werner | 426/576 |
| 4,263,333 | 4/1981 | Maing | 426/540 |

*Primary Examiner*—Jeanette M. Hunter
*Attorney, Agent, or Firm*—Cushman, Darby & Cushman

[57] ABSTRACT

A water-soluble curcumin complex suitable for use as a coloring agent in foods is prepared by dissolving and mixing a source of curcumin and gelatin in an aqueous acetic acid solution. The complex comprises up to about 15% curcumin by weight, and may be incorporated into a wide variety of foodstuffs in either liquid or dry form.

15 Claims, No Drawings

2

WATER-SOLUBLE CURCUMIN COMPLEX

BACKGROUND OF THE INVENTION

1. Field of the Invention

This invention relates to a coloring agent for foodstuffs and the like and, more particularly, this invention relates to a water-soluble curcumin-gelatin complex and a method for preparing the same.

2. Description of the Prior Art

Turmeric is the dried rhizome of the plant Curcuma Longa L. It is used in foods for its coloring ability and less frequently for its flavor. Curcumin is the compound in turmeric that is primarily responsible for its coloring ability. The dried turmeric rhizomes generally contain about 5% curcumin.

Ground turmeric may be extracted with organic solvents to remove the curcumin and the fixed and volatile oils from the cellulose plant material of the rhizomes, to form oleoresins. Solvents such as isopropanol, ethanol, acetone, and ethylene dichloride and others are typically used to prepare oleoresins of turmeric, which may typically contain about 30% curcumin, 30% volatile oils, 30% fixed oils, and 10% polysaccharides. Oleoresins are used by the food industry to color pickles, baked goods, poultry products, and in seasoning mixtures for various other food products.

The fixed and volatile oil portions of the ground spice or the oleoresin are responsible for the characteristic flavor and bitterness of turmeric. This flavor and bitterness is sometimes undesirable in the finished food product. The fixed and volatile oils can be removed from oleoresins by extraction with an organic solvent which is different from that used in the preparation of the oleoresin, from rhizomes, or by physically removing curcumin crystals from the oleoresin by filtration or centrifugation. The resulting volatile oil-free product is known as "debitterized" or "defatted" turmeric.

Curcumin is substantially insoluble in water. Since most food systems contain a significant amount of water, curcumin will not color these systems without the aid of a synthetic chemical emulsifier of some type.

SUMMARY OF THE INVENTION

This invention is directed to overcoming one or more of the problems described above.

According to the present invention, a method of preparing a water-soluble curcumin product which gives a crystal clear yellow solution in water without the aid of an artificial emulsifier is provided.

The curcumin product of the invention is prepared by dissolving a source of curcumin, typically defatted oleoresin turmeric, and gelatin in a solvent comprising up to about 25 wt. % water and the balance acetic acid, preferably at an elevated temperature less than about 90° C. A gelatin-curcumin complex is formed during mixing of the gelatin, curcumin source and solvent. Upon optional removal of the solvent by distillation, spray drying or any other convenient means, a dry, water-soluble product is obtained which may be added to food products in either ground form or in admixture with a suitable dispersing agent, such as table salt or dextrose, for example.

The complex comprises up to a maximum of about 15 wt. % curcumin on a dry basis, and yields colored aqueous solutions of outstanding clarity without the aid of an artificial emulsifier.

Other characteristics and advantages of the invention will be apparent from the following detailed description.

DETAILED DESCRIPTION OF THE PREFERRED EMBODIMENT

Source of Curcumin

Curcumin from virtually any source may be used according to the invention. Suitable curcumin sources include oleoresin turmeric, debittered or defatted oleoresin turmeric, or purified curcumin.

The more pure the curcumin, the clearer will be an aqueous solution of the curcumin complex, since certain oils and other materials found in oleoresin turmeric and other typical curcumin sources tend to cause turbidity in solution.

Gelatin Complexing Agent and Choice of Solvent

Curcumin binds rather strongly with various proteins. However, not all protein-curcumin complexes are readily soluble in water. For example, casein, which is sparingly soluble in water, forms a water-soluble curcumin complex only to the extent that casein itself is soluble, resulting in a complex which does not provide a clear aqueous solution.

Gelatin, on the other hand, is a water-soluble protein which readily binds with curcumin to form a complex which is highly soluble in water.

Gelatin, when dissolved in water, tends to absorb water to form a gel. The strength of the gel is an inherent characteristic of a given gelatin and is measured as "grams bloom" or "bloom", typically varying from about 50 bloom for a weak gel to about 350 bloom for a strong gel.

Low bloom gelatins are of shorter protein chain length and are relatively polar compared to higher bloom gelatins. Hence, lower bloom gels dissolve in water more readily than do higher bloom gelatins.

While curcumin is relatively insoluble in water, it is very soluble in acetic acid. However, relatively low bloom strength gelatins, which are very soluble in water, are not readily soluble in acetic acid; high bloom gelatins are relatively soluble in acetic acid.

It has been found that, according to this invention, a solvent comprising an aqueous solution of acetic acid is a mutual solvent for both low and high bloom gelatins as well as for curcumin.

It has been determined that, as a practical matter, an upper limit of about 25 wt. % water in the solvent is necessary in order to assure substantially complete dissolution of curcumin. As shown in the Examples, below, if the solvent contains more than about 30 wt. % water, an excessive mixing period is required in order to effect dissolution of curcumin. At water levels of about 33 wt. % and above, curcumin does not dissolve unless the mixing temperature is raised to an unacceptably high level.

According to this invention, gelatin and a source of curcumin are dissolved by mixing in a mutual solvent comprising up to about 25 wt. % water, the balance being acetic acid.

The complexing reaction occurs substantially instantaneously as gelatin is dissolved. The resulting complex is soluble in the aqueous acetic acid solvent, thus resulting in a solution of the complex.

Since gelatin tends to form a gel as water is absorbed, the gelatin should be added to the solvent gradually with constant stirring in order to most efficiently effect dissolution.

Preferably, although not necessarily, the source of curcumin should be dissolved prior to the addition of gelatin, since the viscosity of the solution increases as gelatin is added, thereby making mixing relatively difficult.

The mixing is preferably carried out at an elevated temperature of less than about 90° C. At about 90° C. and above, with the preferred 75%/25% acetic acid: water solvent, gelatin begins to denature and loses its ability to be solubilized. A mixing temperature of about 80° C. is preferred with the preferred solvent system. Although the mixing procedure can be carried out at lower temperatures, mixing time increases as the temperature is lowered.

Denaturing of gelatin is evidenced by the formation of an insoluble white precipitate. The initial denaturing temperature of gelatin depends primarily upon the nature of the solvent system, and may to a lesser degree depend upon the gelatin's bloom strength.

For example, gelatin dissolved in pure water does not denature at a temperature at least as high as 100° C., while gelatin dissolved in a 75 wt. % acetic acid/25 wt. % water solvent exhibits signs of denaturing at above about 90° C.

Hence, the upper mixing temperature limit in this invention is determined by the minimum gelatin denaturing temperature in the selected solvent system; this temperature is readily empirically determined.

Proportions of Ingredients

At a preferred solvent composition of about 75 wt. % acetic acid/25 wt. % water, up to about 1 part by weight of gelatin will dissolve in about 3 parts by weight of solvent. Further, it has been found that a maximum of about 15 wt. % curcumin can be complexed with gelatin, based on the total weight of gelatin and curcumin. Variations in the bloom strength of the gelatin have little if any effect on the proportion of curcumin that can be complexed therewith. If desired, of course, a lower proportion of curcumin to gelatin may be utilized.

Solvent Removal

The curcumin-gelatin complex of the invention can be added to food products in solution form with the acetic acid/water solvent in which the complex is formed if the characteristic flavor of acetic acid is not considered objectionable in the final food product. A suitable example is use of a curcumin-gelatin complex solution in water and acetic acid, either in diluted or undiluted form, in pickled food products.

In many cases, however, it may be necessary or desirable to provide the complex in dry form, thus necessitating solvent removal. Substantially complete solvent removal can be effected by various means, including distillation, spray drying, drum drying, air drying or freeze drying, or any other convenient means. The resulting dry product may then be ground and can be used as is or, if desired, it can be plated or mixed with a dispersing agent such as salt or dextrose.

The curcumin-gelatin complex may be incorporated into a wide variety of food products, including gelatin desserts and dry food products such as cake mixes, for example, or in nonfood products. The complex is characterized by a strong yellow color in water, with excellent clarity. No emulsifier is required to effect complete dissolution of the complex in water.

The following specific examples are intended to illustrate the practice of the present invention, but no unnecessary limitations are to be inferred or understood therefrom, as modifications will be apparent to those skilled in the art.

EXAMPLES

EXAMPLE 1

Turmeric as a Source of Curcumin

A. Preparation of Oleoresin Turmeric

Oleoresin turmeric is the combination of flavor and color principles obtained from turmeric (Curcuma Longa L.) by extraction using one or more of the following solvents: acetone, ethyl alcohol, methyl alcohol, isopropyl alcohol, ethylene dichloride, or hexane. Typically, dried turmeric rhizomes are ground to U.S.A. Standard 50 mesh size and are loaded into a percolator for extraction with one or more of the above-identified solvents.

The resulting miscella is then filtered and solvent is removed by vacuum distillation to a residual level less than 30 ppm, as required by the FDA. The curcumin content of the resulting oleoresin varies with the choice of solvent and on the curcumin content of the raw starting material. Commercial oleoresins are usually standardized to a desired curcumin content with a food grade diluent.

B. Preparation of Defatted Oleoresin Turmeric 200 grams of oleoresin turmeric with a curcumin content of 37.5 wt. % was mixed with 200 grams of 0° C. isopropanol and immediately vacuum filtered on a Buchner funnel fitted with #40 Whatman filter paper. The filter cake was dried in a vacuum oven at 55° C. under 29 inches Hg of vacuum for 4 hours to yield 63 grams of defatted turmeric powder with a curcumin content of 94%.

Although all the following examples use defatted oleoresin turmeric as the source of curcumin, oleoresin turmeric may alternatively be used as the curcumin source. However, the fixed and volatile oils present in nondefatted oleoresin cause a slight cloudiness in aqueous solutions, and may impart a faint turmeric flavor to delicately flavored food colored with the curcumim complex product.

EXAMPLE 2

Effect of Solvent Composition

Lower bloom gelatins are relatively polar and hence are not as soluble in pure acetic acid as are higher bloom gelatins. Curcumin, on the other hand, is very soluble in pure acetic acid, but is relatively insoluble in water. In order to determine an optimum mutual solvent composition, solvent systems of the following compositions were evaluated:

Acetic Acid/Water (w/w)

80%/20%
75%/25%
70%/30%
67%/33%

The evaluation procedure used was as follows:

A. 60 grams of each of the solvent compositions was introduced into a respective 150 ml beaker equipped with a magnetic stirring bar and heated to 80°-85° C. with stirring.

B. 1 gram of defatted turmeric (94% curcumin) prepared as described in Example 1(B) was dissolved in the solvent with stirring to obtain a clear yellow solution.

C. 20 grams of 100 bloom gelatin (Davis Grade "J") was gradually added to the mixture of Step (B) with stirring until all gelatin was dissolved.

Under the foregoing conditions, both the curcumin and gelatin dissolved readily in the 80%/20% and 75%/25% solvents. With the 70%/30% solvent system, it took 1.5 hours of stirring to dissolve the curcumin. This was deemed an excessively long period of time for practical purposes. The 67%/33% solvent system would not dissolve the curcumin unless the temperature was raised to 95°-100° C. This also is impractical, since denaturing of gelatin begins at about 90° C. in such a solvent, as evidenced by the formation of a white, insoluble precipitate.

It was determined that about one part by weight of gelatin could be dissolved in three parts by weight of the 75%/25% solvent under the foregoing conditions.

EXAMPLE 3

Preparation of Curcumin-Gelatin Complex

A series of curcumin-gelatin complex products containing from 5% through 25% of curcumin were prepared in 5% increments using 100 bloom gelatin and the 75%/25% solvent system, as follows:

A. In a 500 ml round bottom flask equipped with a magnetic stirring bar, 60 ml of solvent (75 wt. % acetic acid/25 wt. % water) was added and heated to 80°-85° C. with stirring.

B. An amount of defatted oleoresin turmeric was dissolved in the heated solvent with stirring until a clear yellow solution was obtained (5-10 minutes). One gram defatted oleoresin was used for the 5% product, 2 grams were used for the 10% product, 3 grams were used for the 15% product, etc. The 20% sample required heating of the solvent to 100° C. in order to completely dissolve the defatted turmeric, and the 25% sample required heating to 105° C. in order to effect complete dissolution.

C. 20 grams of 100 bloom gelatin (Davis Grade "J") was gradually added to the foregoing solutions with constant stirring. The temperature was carefully maintained at between 80° C. and 85° C.

D. Solvent was removed from each solution by vacuum distillation at 20 mm pressure until a viscous orange solution was obtained.

E. Each solution was completely dried in a vacuum oven at 50°-60° C. under 29 inches Hg of vacuum for approximately 3 hours.

F. Each resulting product was ground in a mortar and pestle to pass through a U.S.A. Standard #170 mesh screen.

EXAMPLE 4

Analysis of Curcumin Loading on Gelatin

In order to determine the maximum amount of curcumin that could be complexed with the gelatin, the absorbance of each of a series of aqueous solutions of the curcumin-gelatin products prepared in Example 3 was measured by spectroscopy as follows:

A. To each of five 250 ml volumetric flasks was added 0.01 grams of a respective 5% through 25% curcumin-gelatin product of Example 3, and the volume made up with distilled water. The 20% and 25% solutions required heating to 70°-80° C. to completely dissolve the product.

B. The visible spectrum was scanned in the absorption mode from 300 nm to 600 nm. 1 cm path length cells were used, with distilled water as the reference. The results were as follows:

| % Curcumin Product Solution | Absorbance (420 nm) |
| --- | --- |
| 5% | 0.087 |
| 10% | 0.192 |
| 15% | 0.295 |
| 20% | 0.330 |
| 25% | 0.288 |

The foregoing data indicate that the maximum utilization of curcumin occurred at about the 15% level, since the absorption level is substantially uniform above about 15%.

EXAMPLE 5

Effect of Gelatin Bloom Strength

This test was performed in order to determine whether curcumin loading varies with the bloom strength of gelatin. Four curcumin-gelatin products were prepared as previously described using gelatins with bloom strengths of 100, 125, 180 and 250, with a 25% loading of curcumin, based on total gelatin plus curcumin, added to the reaction mixture. Spectroscopic analysis of each of the finished products indicated that only about 15% of each finished product was curcumin in each case.

EXAMPLE 6

Gelatin desserts are food products wherein colors are used extensively and where clarity is an important property. The clarity and coloring ability of a 15% curcumin-gelatin complex product made according to the invention was evaluated against an uncolored gelatin. The curcumin content of the finished gelatin dessert was 5 ppm.

The colored gelatin dessert was prepared as follows:
8 grams: Knox Unflavored Gelatin
50 grams: Cane Sugar
0.017 grams: 15% Curcumin-Gelatin Product
452 grams: Water The gelatin, sugar, and curcumin complex was added to a saucepan containing the water and stirred constantly over low heat until all gelatin was dissolved. The saucepan was removed from heat and the solution was poured into a glass beaker and chilled until firm.

At a usage level of 5 ppm, the colored gelatin resembled a commercial lemon Jello ® dessert in color, and the clarity of the chilled gelatin was identical to that of an uncolored gelatin dessert that was prepared in a similar fashion.

EXAMPLE 7

Another application of the curcumin complex product of the invention is in baked goods. In the example, a yellow cake was prepared using a commercial white cake mix and a 15% curcumin-gelatin product prepared as described above, and compared to a cake prepared from a commercially available yellow cake mix.

The cakes were prepared as follows:

250 grams: White Cake Mix (Loven Fresh brand - Aldi Foods, Inc.)
31 grams: Egg White
150 grams: Water
0.041 grams: 15% Curcumin-Gelatin Product (25 ppm, dry basis)

All ingredients were beaten together at high speed for 4 minutes, and poured into a lightly greased cake pan. The cake was baked at 350° F. for 35 minutes.

The yellow cake was prepared in an identical fashion from a Loven Fresh brand yellow cake mix (Aldi Foods, Inc.), and using no curcumin complex.

The yellow cake that was prepared using the curcumin-gelatin product was identical in color to the cake prepared from the commercially available yellow cake mix.

The dry, ground curcumin-gelatin product may be mixed with a dispersing agent such as salt or dextrose to achieve a substantially uniform distribution in dry mixes such as cake mixes or powdered soft drink mixes.

The foregoing detailed description is given for clearness of understanding only, and no unnecessary limitations should be understood therefrom as modifications will be apparent to those skilled in the art.

I claim:

1. A method for preparing a water-soluble curcumin-gelatin coloring agent for foods comprising dissolving a curcumin-containing component and gelatin in a solvent comprising acetic acid, said curcumin-containing component being present in an amount such that the said coloring agent contains a maximum of about 15 weight percent curcumin, on a dry basis, based on the total weight of curcumin and gelatin, said solvent containing a maximum of about 25 weight percent water and said dissolving operation being carried out at a temperature less than the initial denaturing temperature of gelatin in said solvent.

2. The method of claim 1 wherein said solvent contains about 75 weight percent acetic acid and about 25 weight percent water.

3. The method of claim 1 wherein said curcumin-containing component is defatted oleoresin tumeric, oleoresin tumeric or purified curcumin.

4. The method of claim 1 wherein said solvent contains about 75 weight percent acetic acid and about 25 weight percent water; and said gelatin is present in an amount of about 1 part by weight per 3 parts by weight of said solvent.

5. The method of claim 4 wherein said admixing is carried out at a temperature less than about 90° C.

6. The method of claim 1 which includes the additional step of substantially removing said solvent so as to provide said coloring agent in dry form.

7. The method of claim 1 wherein said curcumin-containing component is dissolved in said solvent prior to dissolving said gelatin therein.

8. A method for preparing a water-soluble curcumin-gelatin coloring agent for foods comprising dissolving a curcumin-containing component selected from defatted oleoresin tumeric, oleoresin tumeric and purified curcumin and gelatin in a solvent comprising acetic acid, said curcumin-containing component being present in an amount such that the said coloring agent contains a maximum amount of about 15 weight percent curcumin, on a dry basis, based on the total weight of curcumin and gelatin, said solvent containing a maximum of about 25 weight percent water and said dissolving operation being carried out at a temperature less than the initial denaturing temperature of gelatin in said solvent.

9. A method for preparing a water-soluble curcumin-gelatin coloring agent for foods comprising
   (a) dissolving a curcumin-containing component in a solvent containing about 75 weight percent acetic and about 25 weight percent water, said curcumin-containing component being selected from defatted oleoresin tumeric, oleoresin tumeric and purified curcumin, and
   (b) dissolving in the solution resulting from step (a) about 1 part gelatin per about 3 parts of solvent employed in step (a) at a temperature less than about 90° C. so as to produce said coloring agent wherein said curcumin is present in an amount of a maximum of about 15 weight percent, on a dry basis, based on the total weight of curcumin and gelatin.

10. The method of claim 9 which also includes the additional step of substantially removing said solvent so as to provide said coloring agent in dry form.

11. The water-soluble curcumin-gelatin coloring agent produced according to the method of claim 10.

12. The water-soluble curcumin-gelatin coloring agent of claim 11 in dry form.

13. A method of imparting a yellow color to a food product comprising mixing said food product with the water-soluble curcumin-gelatin coloring agent of claim 11.

14. The method of claim 13 wherein said food product is in dry form and said coloring agent is dispersed on a dispersing agent.

15. The method of claim 13 wherein said water-soluble curcumin-gelatin coloring agent is in dry form.

* * * * *